United States Patent [19]

Torimoto et al.

[11] Patent Number: 4,723,754
[45] Date of Patent: Feb. 9, 1988

[54] FLOW RATE CONTROL VALVE SYSTEM

[75] Inventors: Koichi Torimoto; Hiroyuki Shirakawa; Yoichi Sumi, all of Hyogo, Japan

[73] Assignee: Mitsubishi Denki K.K., Tokyo, Japan

[21] Appl. No.: 931,827

[22] Filed: Nov. 18, 1986

[30] Foreign Application Priority Data

Nov. 19, 1985 [JP] Japan ................. 60-259177

[51] Int. Cl.⁴ .............................. F16K 31/04
[52] U.S. Cl. ................... 251/129.05; 251/129.08; 251/129.11; 251/129.2
[58] Field of Search ............ 251/129.11, 129.05, 251/129.08, 129.2

[56] References Cited

U.S. PATENT DOCUMENTS 4,650,159  3/1987  Shimamura ............... 251/129.11 X

FOREIGN PATENT DOCUMENTS 0128570  8/1983  Japan ..................... 251/129.11

Primary Examiner—Arnold Rosenthal
Attorney, Agent, or Firm—Sughrue, Mion, Zinn, Macpeak & Seas

[57] ABSTRACT

A flow rate control valve system in which a valve plug is linearly driven against a valve seat by a stepping motor. The valve plug is fixed to a sleeve that has internal threads mating with external threads on the motor shaft. Splines prevent rotation of sleeve and plug. A bearing is interposed between a smooth end of the shaft and the plug.

3 Claims, 2 Drawing Figures

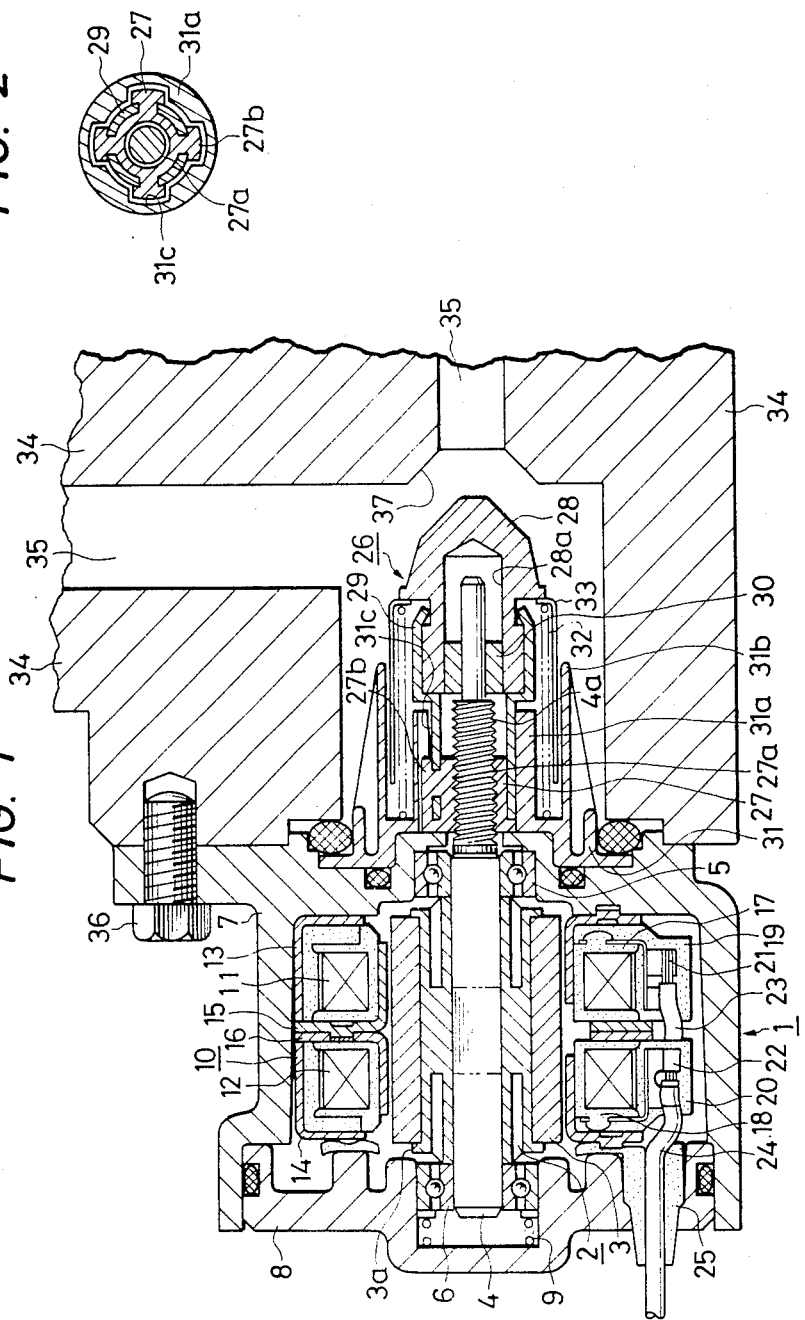

FLOW RATE CONTROL VALVE SYSTEM

BACKGROUND OF THE INVENTION

1. Field of the Invention

This invention relates to a flow rate control valve system for controlling the flow rate by controlling the valve plug position by converting the rotation of a stepping motor into a linear movement.

2. Background of the Invention

A flow rate control valve system of the sort disclosed by, for instance Japanese Patent Application (OPI) No. 194658/84 is constructed so that a valve plug is fixed to the front end of the output shaft of a stepping motor contained in a mechanism for converting its rotation into a linear movement. Alternately, such a mechanism for converting the rotation of a stepping motor into a linear movement is provided by screwing and fitting the externally threaded linear output shaft, which is allowed to move only in the axial direction, into the threaded hollow rotary shaft of the stepping motor. When the mechanism is utilized to drive the flow control valve, the front end of the linear output shaft is fixed to the valve plug and the output shaft is moved in the axial direction proportionally to the amount of rotation of the stepping motor to control the flow rate by controlling the position of the valve plug relative to the valve seat.

An example of the latter structure is disclosed by Kobayashi et al in U.S. Pat. No. 4,381,747. In this structure, the output shaft of the stepping motor is fixed to the valve plug and is prevented from rotating by an arm affixed to the output shaft and sliding in an axial slot of the motor housing. The output shaft is threaded externally to internal threads of the motor rotor. Thereby, the turning rotor axially moves the output shaft. However, there results a long projection of the output shaft.

Since the rotary shaft of the stepping motor thus constructed holds the output shaft linearly moving therein, the diameter of the rotary shaft tends to become large and thus bearings for bearing the housing tend to become large and costly. Moreover, the output shaft must also be pivotally supported and this makes the construction of the bearings for bearing both shafts within the housing not only complicated but also large. In addition to the above problem, the total weight of the portions linearly driven and the inertia increase because the valve plug and the output shaft are linearly moved together when the valve plug is driven by the output shaft, makes it extremely difficult to implement highly-responsive, high-speed and accurate flow rate control.

SUMMARY OF THE INVENTION

Accordingly, an object of the invention is to provide a smaller mechanism for converting rotary motion to linear motion in a flow rate control valve system.

In the flow rate control valve system according to the present invention, only the rotary shaft of the stepping motor is projected from the housing and only the valve plug is moved in the axial direction by screwing and fitting onto only the projection the valve plug allowed to move in the axial direction.

Moreover, a hollow is formed in the valve plug and a self-lubricating bearing metal is fitted into the hollow and further the end of the rotary shaft is tightly supported by the metal bearing.

Since the mechanism for converting the rotation into a linear movement according to the present invention is realized by screwing and fitting the valve plug into the rotary shaft of the stepping motor on the outside thereof, it is only necessary for the bearings of the motor to bear its own rotary shaft. Accordingly, the mechanism is made simple and compact, and highly-responsive flow control become possible because not only the portion linearly driven but also the inertia can be reduced. Moreover, the bearing metal installed in the hollow tightly supports the rotary shaft to prevent the valve plug from falling, thus making possible accurate flow rate control.

BRIEF DESCRIPTION OF THE DRAWINGS

FIG. 1 is a sectional view of an embodiment of the present invention.

FIG. 2 is a sectional view of the sleeve portion of FIG. 1.

DETAILED DESCRIPTION OF THE PREFERRED EMBODIMENTS

Referring now to the accompanying drawings, an embodiment of the present invention will be described. In FIG. 1, there is shown a stepping motor 1, which is constructed as follows. A rotor 2 consists of a cylindrical permanent magnet 3 alternately magnetized in opposed directions on its circumference and a holding member 3a molded to fix the permanent magnet 3 to a rotary shaft 4. The rotary shaft 4 is supported by an inner housing 7 and an outer housing 8 through bearings 5 and 6 with one end of the rotary shaft 4 passing through the inner housing 7 and projecting therefrom. The inner housing 7 is cylindrical and has a depressed end, whereas the roughly cylindrical outer housing 8 is fitted into the inner housing 7 and is fixed in such a manner as to close the open end of the outer housing 8. A spring 9 is provided in the axial gap between the outer bearing 6 and the outer housing 8 to define the axial position of the rotary shaft 4 by pressing and causing the rotor 2 to be biased in the inner axial direction through the outer bearing 6.

A stator 10 having stator coils 11 and 12, edge face yokes 13 and 14 and intermediate yokes 15 and 16 is contained in the inner housing 7. Each of the edge face and intermediate yokes 13-16 has a pole shoe projecting in the axial direction on the inner periphery of the coil. The yokes 13-16 are so arranged as to engage with each other alternately through the gap. A pair of combinations of the intermediate and edge face yokes 13-16 and the stator coils 11 and 12 are arranged in the axial direction. The coils 11 and 12 are wound on bobbins 17 and 18 and further impregnated with plastic into respective integral bodies 19 and 20. The ends (including intermediate taps) of the coils are led out by leads 23 and 24 through terminals 21 and 22. The leads 23 and 24 are allowed to pass through a rubber packing 25 arranged in the outer housing 8.

A valve system 26 that is driven in the axial direction as the rotary shaft 4 rotates is constructed as follows. A positive screw 4a is formed on part of the outer periphery of the rotary shaft 4 projecting from the housing 7. A sleeve 27 has a negative internal screw 27a at its rear end engaging with the positive screw 4a. The sleeve 7 includes a radial projection 27b formed on its outer periphery and projecting outside the main sleeve diameter, as shown in FIG. 2. A valve plug 28 arranged at the front end of the rotary shaft 4 has an axial hole 28a into which the rotary shaft 4 is fitted. The valve plug 28 is fitted into a forward end of a cylindrical holder 29, which, at its rear end, is formed by aluminum molding to hold one end of the sleeve 27 and is incorporated into the sleeve 27 by caulking. A cylindrical self-lubricating metal guide 30 prepared by impregnating sintered alloy with lubricating oil and which is press-fitted into the axial hole 28a of the valve plug 28 tightly holds the front end of the rotary shaft 4 and causes the valve plug 28 to move linearly without toppling on the rotary shaft.

A holder 31 has concentric inner and outer cylindrical holder portions 31a and 31b, and holder 31 is fixed to and held by the inner motor housing 7. The sleeve 27 is fitted over the inner periphery of the inner cylindrical holder portion 31a, and there is further formed radially outwardly extending guide grooves 31c in the inner surface of the inner cylindrical holder portion. These guide grooves 31 mate with the projections 27b of the sleeve and extends in the axial direction, whereby they constitute a spline mechanism with the projection 27b operating as a key and the guide grooves 31c operating as keyways. As shown in FIG. 2, there are four pairs of mating guide grooves 31c and projections 27b.

The length of the inner cylindrical holder portion 31a is set great enough to prevent the projections 27b of the sleeve from being exposed even if the valve plug 28 is moved up to maximum projected position. A spring 32 is used to press the valve plug 28 to the right of FIG. 1 and a cylindrical spring guide 33 installed on the spring moves together with the valve plug 28. One radially bent end of the spring guide 33 is pressed by the spring 32 against the valve plug 28 and the spring guide held thereby so as to more axially with the valve plug. The spring guide 33 forming a first cylindrical cover member is superposed on the outer cylindrical member holder portion 31b forming a second cylindrical cover member with a very small gap left therebetween to prevent foreign substances from intruding in between the interior contacting faces. The axial dimensions of the superposed outer cylindrical member 31b and the spring guide 33 are set greater than the maximum amount of the movement of the valve plug 28 and the superposed state is held even if the valve plug 28 moves up to the maximum projected position. A passage housing 34 has formed therein a channel 35 for fluid whose flow rate is controlled by the plug 28. The controlled channel 35 operates as a bypass around a throttle valve in an intake pipe of the throttle valve apparatus of an internal combustion engine. The housing 7 of the stepping motor is fixed to the passage housing 34 with a screw 36 and the valve plug 28 is so arranged as to face a valve seat 37 formed in the fluid channel 35.

In the embodiment thus arranged, the pole shoes of the yokes 13-16 have alternately reversed directions of magnetism and the magnetic field is switched in predetermined order when a pulse driving signal is applied by an external controller (not shown) to each phase of each of the coils 11 and 12 in predetermined order through the terminals 21 and 22. The yokes 13-16 are attracted and repulsed by the permanent magnet 3 of the rotor, so that the rotor 2 rotates in steps according to the applied driving signal. When the rotary shaft 4 rotates as the rotor 2 rotates, the sleeve 27, screwed into the rotary shaft 4 and splined by the inner cylindrical holder portion 31a is directly and linearly moved in the axial direction along the guide grooves 31c together with the valve plug 28. In consequence, the valve plug 28 changes its position relative to the valve seat 37 according to the pulse driving signal supplied to each phase of each of the coils 11 and 12 and is caused to control the fluid volume in the fluid channel 35 and thus the flow rate. When the fluid channel 35 is arranged in the bypass of the throttle valve of the engine, the valve plug 28 controls idling rotation rate by controlling the intake amount.

To convert the rotation of the stepping motor 1 into a linear movement according to the present embodiment, the rotary shaft 4 projects from the inner motor housing 7 and the rotary shaft 4 is screwed and fitted into the sleeve 27 incorporating the valve plug 28. Consequently, it is only necessary to pivotally support the rotary shaft of the rotor within the housings 7 and 8 of the stepping motor. The thus simplified, compact construction of the bearing is capable of making the rotor compact and lightweight, whereas the linearly moving parts are limited to the valve plug 28 covered with the sleeve 27. Thereby, the output shaft 4 extending from the inside of the stepping motor to the outside thereof need not be moved simultaneously and linearly. It becomes possible, accordingly, to make that portion lightweight and provide highly-responsive flow rate control by reducing the inertia. Since the valve plug 28 has the hollow hole 28a in which the rotary shaft 4 is rotatably supported by the self-lubricating guide metal 30, the valve plug 28 in linearly movable without toppling on the rotary shaft and is accurately controllable in terms of the position relative to the valve seat and therefore the flow rate.

Since the spring guide 33 held by the valve plug 28 is superposed on the outer cylindrical holder portion 31b of the holder 31 with the very small gap left therebetween in the radial direction, they encircle each interior contact face even if the valve plug 28 moves back and forth and prevent foreign substances such as dust contained in the fluid from intruding therein and from causing contact failure because of the foreign substances. Although the sleeve 27 slides in the axial direction while mating with the spline means provided on the inner periphery of the inner cylindrical holder portion 31a of the holder 31, dust hardly attaches to the contacting face on the outer periphery of the sleeve 27 because the inner cylindrical holder portion 31a is set long enough to prevent the sleeve 27 from being exposed at the maximum position of movement of the sleeve (the maximum position of projection of the valve plug 28). Dust is prevented from attaching to the outer peripheral contact face of the sleeve 27 and, in view of this, contact failure is prevented. In addition, the dust existing in the fluid is hardly allowed to intrude in between the contacting faces because the outer periphery of the holder 29 coupling together the sleeve 27 and the valve plug 28 is stepped with the constriction between the outer periphery thereof and the edge face of the inner cylindrical holder portion 31a of the holder.

Since the guide metal 30 for guiding the valve plug 28 in the linear direction is combined with the valve plug 28, it along must solely subject the valve plug 28 to the applied transverse force. Therefore, the contacting surfaces hardly wear and the valve plug 28 is allowed to stably move linearly relative to the rotary shaft 4 without jittering for a long period of time.

The disclosure of this application is similar to that of Japanese Patent Application 60-259178, for which there corresponds U.S. patent application, Ser. No. 931,819, filed Nov. 18, 1986.

As set forth above, the rotation of the stepping motor is converted into a linear movement by screwing and fitting the valve plug onto the outside of the projection of the rotary shaft thereof through the sleeve, whereby the axial construction of the stepping motor is such that it is required to support only its rotary shaft and therefore the flow rate control valve can be made simple, compact and lightweight. Moreover, since the portion that is linearly driven does not require a long output shaft as in the case of the conventional valve, it is formed with only the valve plug and thus made lightweight. Thereby flow rate control with high response efficiency becomes possible. Furthermore, the metal bearing tightly supporting the rotary shaft and which is installed in the hollow valve plug prevents the valve plug from folling and ensures accurate stable flow rate control.

What is claimed is:

1. A flow rate control valve system, comprising:
   a motor included within a housing and including a rotary shaft projecting from said housing, said projecting shaft including an outer circumference screw portion;
   a sleeve including an inner circumference screw portion mating with said screw portion of said projecting shaft;
   means for preventing a rotation of said sleeve and allowing a movement of said sleeve along an axial direction of said projecting shaft;
   a fluid flow channel;
   a plug fixed to said sleeve and operative with said fluid flow channel for controlling the flow rate of a fluid in said channel, said plug having a axial hole fitted over an outer end of said projecting shaft and being rotatably supported by said outer end; said motor being a stepping motor and said fluid flow channel including a valve seat into which said plug is movable along said axial direction;
   said projecting shaft having a smooth cylindrical portion at the outer end radially bearing said plug; and
   a self-lubricating metal guide fitted to the interior of said plug and rotatably borne by said smooth cylindrical portion of said projecting shaft, whereby said smooth cylindrical portion bears said plug.

2. A valve system as recited in claim 1, wherein said preventing and allowing means comprises splining means connected between said sleeve and said housing.

3. A valve system as recited in claim 1, further comprising:
   a first cylindrical cover member supported by said plug having a radially projecting end proximate to said plug;
   a second cylindrical cover member supported by said motor housing closely adjacent said first cylindrical cover member; and
   a compression spring interposed between said motor housing and said radially projecting end of said first cylindrical cover member for biasing said first cylindrical cover member against said plug so that said first cylindrical cover member moves axially with said plug.

* * * * *